UNITED STATES PATENT OFFICE.

JOSEPH D. DELISLE, OF LOWELL, MASSACHUSETTS.

BITTER TONIC.

SPECIFICATION forming part of Letters Patent No. 402,312, dated April 30 1889.

Application filed March 5, 1889. Serial No. 302,007. (No specimens.)

*To all whom it may concern:*

Be it known that I, JOSEPH D. DELISLE, a subject of Victoria, Queen of the United Kingdom of Great Britain and Ireland, residing at Lowell, in the county of Middlesex and Commonwealth of Massachusetts, have invented a new and useful Composition of Matter to be used for a Tonic Medicine, of which the following is a specification.

My composition consists of the following ingredients, combined in about the proportions stated, to wit: Citrate of iron and quinine, three drams; tincture of nux vomica, one ounce; tincture of quassia, three ounces; pure white wine, nineteen and five-eighths ounces. The above proportions are stated in the denominations of apothecary's weight. These ingredients should be thoroughly mixed by stirring or shaking.

The composition above described is used as a tonic medicine for the treatment of all cases of debility—as, for instance, in convalescence after fevers—to give an appetite and to purify and strengthen the blood.

This medicine is useful for women during pregnancy, the citrate of iron and quinine acting to purify the blood, the tincture of nux vomica having a beneficial effect upon the nerves, and the tincture of quassia aiding the digestive organs.

This medicine should not be taken by women during the period of menstruation.

The dose of the above-described medicine for an adult person is one table-spoonful before eating.

The medicine should be shaken immediately before taking.

What I claim, and desire to secure by Letters Patent of the United States, is—

The above-described composition of matter to be used as a tonic medicine, consisting of citrate of iron and quinine, tincture of nux vomica, tincture of quassia, and white wine, in substantially the proportions specified.

In witness whereof I have signed this specification, in the presence of two attesting witnesses, this 21st day of February, A. D. 1889.

JOSEPH D. DELISLE.

Witnesses:
ALBERT M. MOORE,
PHILIP BEAULIEU.